(12) United States Patent
Kojic et al.

(10) Patent No.: US 7,107,964 B2
(45) Date of Patent: Sep. 19, 2006

(54) CONTROL OF AUTO-IGNITION TIMING FOR HOMOGENEOUS COMBUSTION JET IGNITION ENGINES

(75) Inventors: Aleksandar Kojic, Cupertino, CA (US); Jean-Pierre Hathout, San Jose, CA (US); David Cook, Stanford, CA (US); Jasim Ahmed, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/681,056

(22) Filed: Oct. 7, 2003

(65) Prior Publication Data

US 2005/0072399 A1    Apr. 7, 2005

(51) Int. Cl.
*F02B 19/02* (2006.01)
(52) U.S. Cl. ............... 123/254; 123/258; 123/272; 123/292
(58) Field of Classification Search ............... 123/254, 123/258, 272, 275, 292, 295
See application file for complete search history.

(56) References Cited

U.S. PATENT DOCUMENTS

| | | | | |
|---|---|---|---|---|
| 4,898,126 A | * | 2/1990 | Merritt | 123/272 |
| 4,926,818 A | * | 5/1990 | Oppenheim et al. | 123/297 |
| 5,067,458 A | * | 11/1991 | Bailey | 123/292 |
| 5,109,817 A | * | 5/1992 | Cherry | 123/272 |
| 5,224,450 A | * | 7/1993 | Paul et al. | 123/292 |
| 6,260,520 B1 | * | 7/2001 | Van Reatherford | 123/48 AA |
| 6,427,643 B1 | * | 8/2002 | Dixon | 123/48 A |
| 6,595,181 B1 | | 7/2003 | Najt et al. | 123/295 |
| 6,694,944 B1 | * | 2/2004 | Agama et al. | 123/292 |
| 2002/0035984 A1 | * | 3/2002 | Brardinelli et al. | 123/272 |
| 2004/0237928 A1 | * | 12/2004 | Sun et al. | 123/275 |

OTHER PUBLICATIONS

Ciezki, H. K., Adorneit, G., "Shock-Tube Investigation of Self-Ignition of n-Heptane-Air Mixtures Under Engine Relavent Conditions," Combust. and Flame, 93, 421-433, 1993.
Pitsch, H., Peters, N., "Investigation of the Ignition Process of Sprays Under Diesel Engine Conditions Using Reduced n-Heptane Chemistry," SAE Technical Paper 982464, 1998.

* cited by examiner

*Primary Examiner*—Erick Solis
(74) *Attorney, Agent, or Firm*—Kenyon & Kenyon

(57) ABSTRACT

A method and system of controlling auto-ignition timing in an internal combustion engine cylinder in which the timing of auto-ignition in prechambers that are coupled to the cylinder is precisely controlled. The auto-ignition in the prechambers produces hot gas jets that are introduced into the charge space of the cylinder and rapidly induce a second auto-ignition of the mixture in the cylinder. By precisely controlling the timing of the auto-ignitions within the prechambers, the timing of the auto-ignition within the cylinders can, in turn, be precisely controlled.

22 Claims, 5 Drawing Sheets

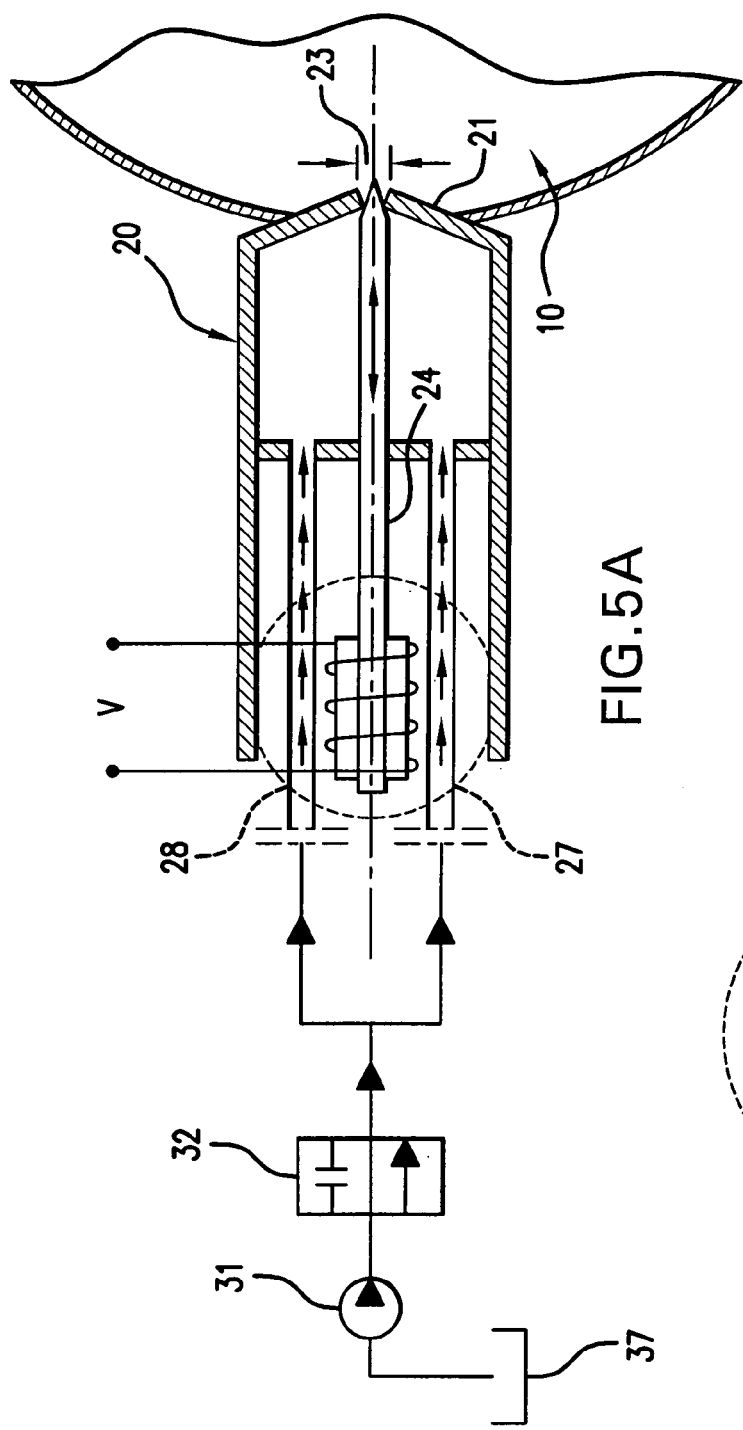
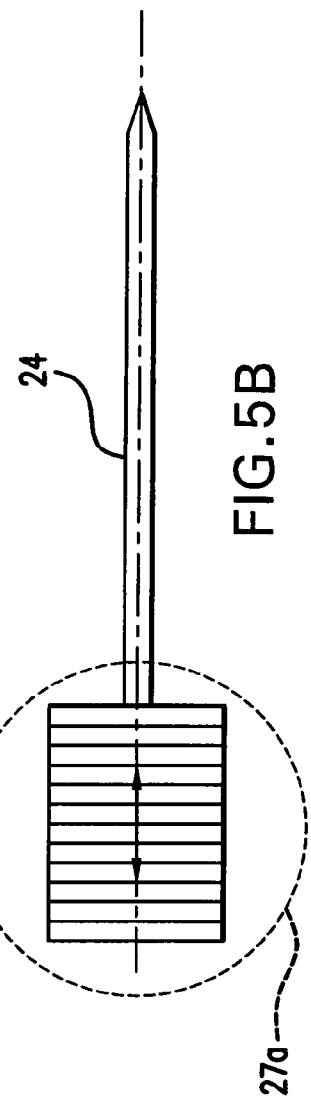
FIG.5A
FIG.5B

CONTROL OF AUTO-IGNITION TIMING FOR HOMOGENEOUS COMBUSTION JET IGNITION ENGINES

FIELD OF THE INVENTION

The present invention relates to a method and system for initiating combustion in a cylinder of an internal combustion engine, and more particularly relates to a Homogeneous Combustion Jet Ignition (HCJI) system and method in which hot gas jets produced by auto-ignition in cylinder prechambers enter the cylinder at precisely controlled times and induce auto-ignition of the contents of the cylinder.

BACKGROUND INFORMATION

There is an ever-greater need and demand for combustion techniques that minimize emissions through efficient burning of fuel components. One such technique is Homogeneous Charge Compression Ignition (hereinafter "HCCI") in which a well-mixed, lean mixture of fuel and air is auto-ignited, i.e., ignited without use of a spark, which usually results in a rapid combustion of fuel components. This combustion technique is potentially more efficient and environmentally-friendly than conventional spark-ignited combustion because the rapidity of the combustion prevents heat losses to the walls of the engine cylinder, approaching a constant volume combustion which is more efficient and allows for use of a higher compression ratio, and also because use of a well-mixed, lean mixture results in a decrease in the total production of pollutants, some of which are almost completely eliminated.

The practical implementation of HCCI has been somewhat hampered by the difficulty of controlling the auto-ignition under variable loading conditions. It has been found that small variations in the temperature field within the engine cylinder can produce large variations in ignition timing, and can result in misfire, in which combustion fails to occur, or other deleterious consequences which reduce engine efficiency.

In another promising technique, referred to as the Pulsed Jet Combustion method (hereinafter "PJC"), combustion is initiated in small prechambers coupled to the cylinder via small orifices. Combustion in the prechambers produces hot jets of gas which escape through the orifices into the cylinder where the jets entrain unburned gases in the fuel-air mixture in the cylinder, igniting the mixture. The action of the jets improves combustion efficiency because of the "fireball" created that rapidly spreads through the volume of the cylinder, in contrast to the thinner "flame" that is produced by spark ignition. However, current PJC techniques employ spark-ignition within the prechambers, and therefore combustion within the prechambers suffers to some degree from the uneven combustion and inefficiencies associated with spark-ignition. Additionally, the combustion produced in the cylinder using PJC is not volumetric as in HCCI, but depends upon the spread of the fireball from the prechamber, which may not be completely uniform. Therefore, combustion in the cylinder may also be somewhat uneven and some portion of the hydrocarbon fuel may remain unburned.

SUMMARY OF THE INVENTION

The present invention provides a Homogeneous Combustion Jet Ignition technique (hereinafter denoted as "HCJI") that combines the advantages of HCCI and PJC, while simultaneously eliminating their respective drawbacks.

The present invention provides a method of controlling auto-ignition timing in an internal combustion engine cylinder in which the timing of auto-ignition in one or more prechambers coupled to the cylinder are precisely controlled. The auto-ignition in the prechambers produces hot gas jets that are introduced into the charge space of the cylinder; the hot gas jets rapidly induce a second auto-ignition of the mixture in the cylinder. Accordingly, by precisely controlling the timing of the "starter" auto-ignitions within the prechambers, the timing of the auto-ignition within the cylinders can, in turn, be precisely controlled.

In order to accomplish the precise timing, conditions within the prechambers are set or modified in comparison to the cylinder so as to cross a threshold for auto-ignition at a precisely controlled time interval while conditions in the cylinder remain below the threshold for auto-ignition. There are several ways in which this may be accomplished: the fuel-air mixture in the prechambers may be enriched to a rich level; the temperature within the prechambers may be boosted; and additives and/or catalysts may be added to the prechamber to facilitate auto-ignition. Each of these techniques serve to reduce the time delay between a time at which the pressure is raised in the prechambers sufficient to induce auto-ignition, and the time at which combustion actually takes places. A smaller delay time implies a lower possibility of misfires and a greater overall control over the timing of combustion. It is found that the optimal delay time is approximately 1 millisecond or less.

According to a specific embodiment of the method of the present invention, prechamber microvalves are kept open during a first stage of a compression stroke of a piston in the cylinder to bring the pressure within the prechambers to the pressure level above the piston in the cylinder. At a selected subsequent time, in an intermediate stage of the compression stroke, the prechamber microvalves are closed, isolating the prechambers from the cylinder and maintaining the pressure within the prechambers at a constant level as the pressure level in the charge space of the cylinder increases. At a subsequent stage of the compression stroke, the prechamber microvalves are opened, bringing the prechambers to auto-ignition after the short time delay. The exact timing of the closing and subsequent opening of the microvalves is determined based on the requested load demand and current operating parameters in the cylinder. Generally, the opening of the microvalves leading to auto-ignition in the prechambers occurs when the piston approaches a top dead center (TDC) position in the cylinder.

The present invention also provides a system for Homogeneous Combustion Jet Ignition (HCJI) in an internal combustion engine cylinder. The system includes an electronic control unit that receives data regarding requested load demand and current operating parameters within the cylinder and controls the microvalves coupling the cylinder to the prechambers based on the received data so as to induce auto-ignition within the prechambers.

BRIEF DESCRIPTION OF THE DRAWINGS

FIG. 5a shows a longitudinal cross-section of an exemplary embodiment of a prechamber and microvalve assembly that may be used in the context of the present invention.

FIG. 5b shows an alternative embodiment of an actuator for use in the assembly of FIG. 5a.

DETAILED DESCRIPTION

Figure 1:
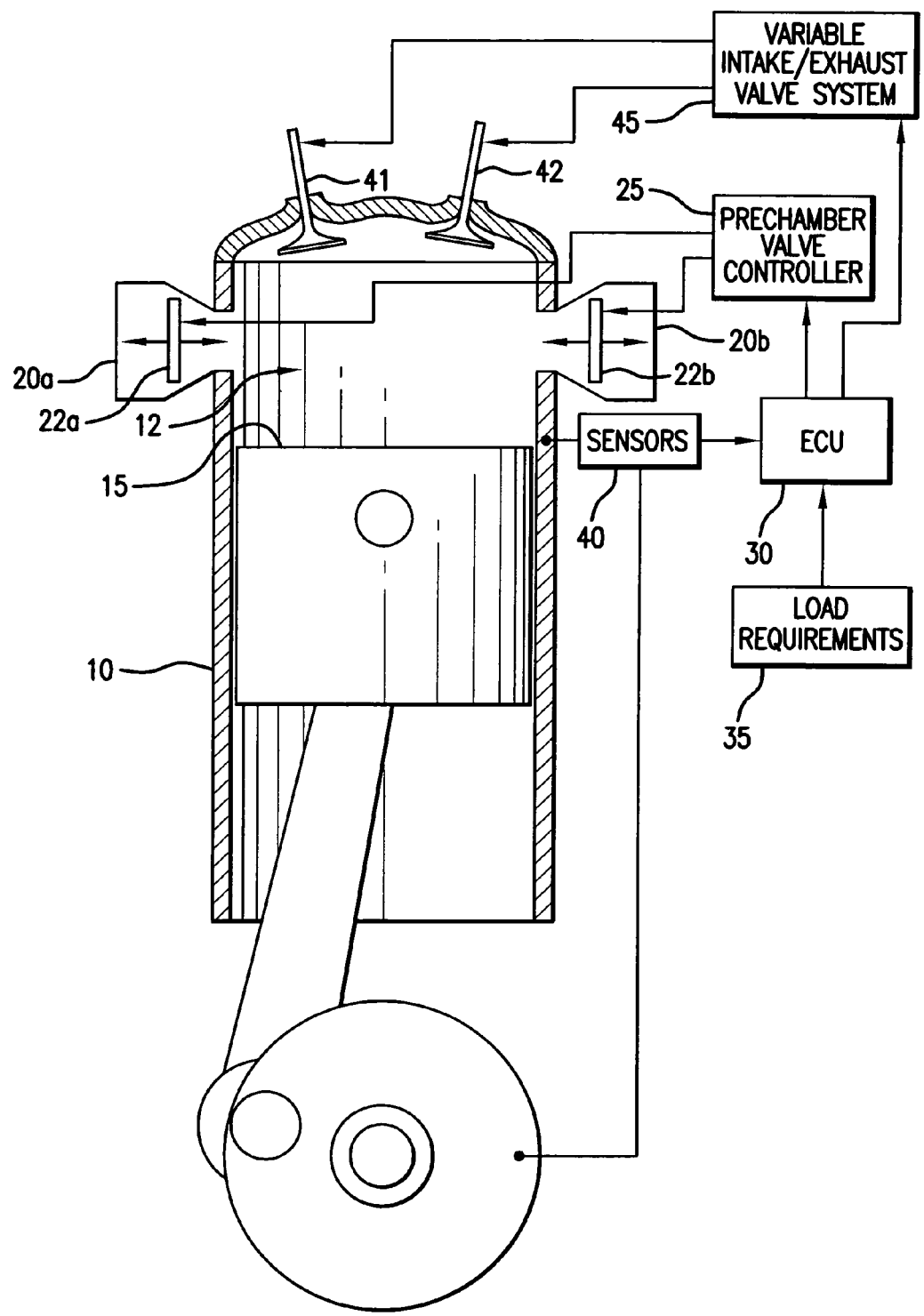
FIG. 1 shows a schematic diagram of an embodiment of an engine system that can be used in conjunction with the HCJI process of the present invention.
Figure 2D:
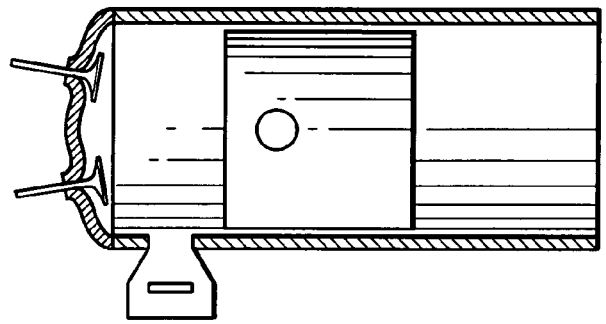
FIG. 2 shows various positions (a) through (d) of a piston within a cylinder during an engine cycle and illustrates an example of when the prechamber microvalves may be opened and closed according to the method of the present invention.
Figure 2C:
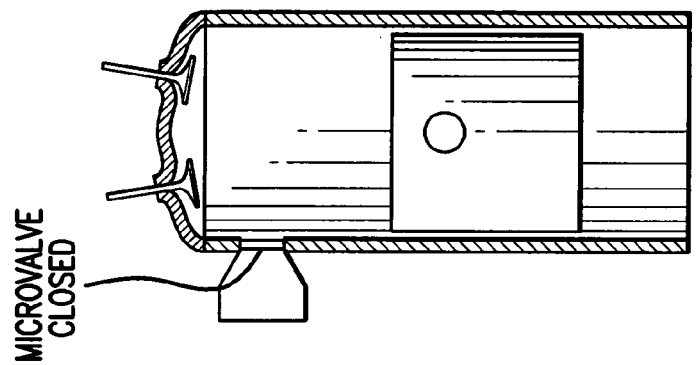
Figure 2B:
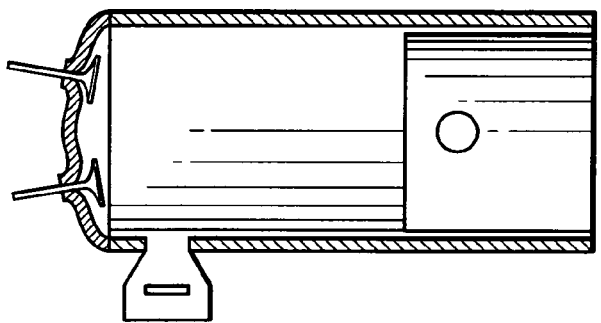
Figure 2A:
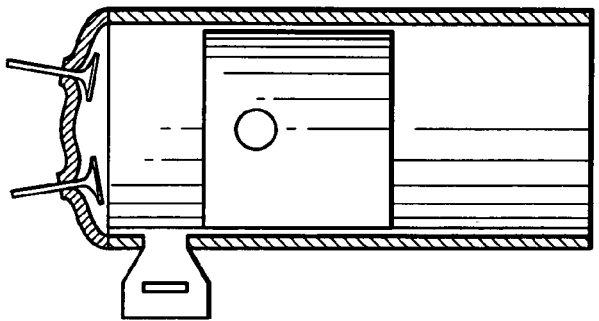

FIG. 1 shows a schematic diagram of an embodiment of an engine system that can be used in conjunction with the HCJI technique according to the present invention. As shown, an engine cylinder 10 enclosing a charge space 12 and a piston 15 is coupled to one or more prechambers. In the depicted embodiment, two prechambers 20a, 20b are shown, each situated near to the top of the cylinder and extending outwardly from its side surface. Each prechamber 20a, 20b encloses a volume that is smaller than the volume enclosed by the cylinder by two orders of magnitude. The prechambers 20a, 20b are coupled to the cylinder 10 via respective prechamber microvalves 22a, 22b that when closed, completely cut the prechambers off from the cylinders, isolating the prechambers from the cylinder and allowing different ambient conditions (e.g., temperature and pressure) to develop in the prechambers in comparison to the cylinder. While in the depicted embodiment, each prechamber 20a, 20b is coupled to the cylinder 10 via a single microvalve 22a, 22b, it is also possible to have each prechamber coupled to the cylinder by more than one microvalve. The positions of the prechamber microvalves 22a, 22b are controlled directly by a prechamber valve controller 25 which is, in turn, controlled by the electronic control unit (ECU) 30 of the motor vehicle.

Each of the prechambers also includes an intake valve through which fuel and/or other additives may be added to enrich the fuel-air mixtures contained in the prechambers. At any given instant of engine operation, the ECU determines whether to open or close the microvalves 22a, 22b, and the timing thereof, based upon load requirement inputs 35 derived from the driver, and from inputs received from cylinder sensors 40 that indicate the current state of the engine (i.e., the temperature (T), pressure (P), equivalence ratio (Φ), crank angle, etc., prevailing in each of the engine cylinders). The ECU also governs a variable intake/output valve system 45, which directly controls the input of fuel charges into the cylinder 15 via the intake valve 41, and the exhaust of combustion products through the exhaust valve 42.

FIG. 5a shows an exemplary embodiment of a prechamber and microvalve assembly that may be used in the context of the method and system of present invention. It is to be understood that the assembly depicted is exemplary and that other types of prechamber and microvalve assemblies may also be used in the context of the present invention. As shown, the microvalve 22 comprises a needle 24 that runs longitudinally and is centered within the prechamber 20. The needle 24 is controlled by an actuator 27 which in this case is implemented using a magnetic solenoid and coil. By varying the voltage across the coil, the needle can be controlled to shift longitudinally either toward or away from the cylinder 10, opening or blocking the orifice 23 between the prechamber and the cylinder. As depicted, the valve is in a closed position, with the needle fully extended, emerging through and blocking the orifice 23. Fuel and/or premixed reactants may be supplied to the prechamber by activation of a pump 31 which draws fuel and reactants from a tank 37 and delivers them via a proportional or on/off switch 32 to one or more inlet passages 28 which drain at the prechamber.

The prechamber itself may be implemented as an approximately cylinder-shaped chamber having a cone-shaped end surface 21 facing the cylinder. In an exemplary embodiment, the prechamber may be dimensioned so as to range between 5 and 20 mm in both diameter and length. The end surface 21 may protrude toward the cylinder between 1 and 5 mm, and the orifice 23 in the end surface may be between 0.5 and 3 mm in diameter.

FIG. 5b shows an alternative actuator arrangement that may be used in the context of the assembly shown in FIG. 5a. In this case, the needle 24 is coupled to a piezoelectric stack 27a, which acts as the needle actuator, rather than a magnetic solenoid. The piezoelectric stack 27a includes layers of material that expand or contract in response to the application of an electric field across the layers of the stack. As the piezoelectric stack 27a is directly coupled to the needle 24, the expansion and contraction of the layers translate into a forward or backward motion of the needle, and to a closing or opening of the microvalve.

FIG. 2 shows various positions (a) through (d) of a piston within a cylinder during an engine cycle and illustrates an example of when the prechamber microvalves may be opened and closed according to the method of the present invention. While only a single prechamber is shown coupled to the cylinder in FIG. 2, it is to be understood that this is merely illustrative of a specific embodiment, and that other prechambers (located into or out of the page or on the opposite side of the cylinder) may be included to facilitate auto-ignition in the cylinder. Positions (a) and (b) depict the two extremes in piston position in the cylinder, and represent a Top Dead Center (TDC) position and a Bottom Dead Center (BDC) position, respectively. The sequence from position (b) through to position (d) depicts a compression stroke in which the piston moves upward from the BDC position to an intermediate position (c) and then to nearly the TDC position (d).

Prior to the compression stroke, between positions (a) and (b), the piston travels downward through the cylinder in an intake stroke, during which fresh fuel and air enter the charge space of the cylinder through the (opened) intake valve, and a portion of the exhaust fumes exit through the opened exhaust valve. The prechamber microvalves are open throughout the intake stroke.

As the piston moves upward, from position (b) to position (c), the ECU directs the prechamber valve controller to keep the microvalves open. During this time, gas flows from the cylinder through the microvalves into the prechambers which gradually raises the pressure within the prechambers to approximately the pressure level within the cylinder. In one example embodiment of the present invention, early on in the compression stroke as the fuel-air mixture from the cylinder is beginning to be forced into the prechambers, additional fuel is also injected at low pressure into the prechambers so that the fuel-air mixture within the prechambers reaches a fuel-rich level, in contrast to the leaner mixture within the cylinder. The early injection of fuel provides ample time for the fuel and air within the prechambers to be well-mixed and homogeneous. The relatively rich mixture within the prechambers is maintained throughout the compression stroke, since no fuel exits from the prechambers into the cylinder via the microvalves due to the pressure-difference between the prechambers and the cylinder.

When the piston reaches position (c) along the compression stroke, the ECU directs the prechamber valve controller to close the microvalves (the valve is shown closed in position (c) in FIG. 2), separating the prechambers from the cylinder, thereby maintaining a constant pressure in the prechambers while the cylinder pressure continues to increase during the compression stroke. At this point, the ECU determines, based on the requested load demand and the current operating parameters, an optimum time for prechamber auto-ignition. This is normally close to the interval when the piston position is close to TDC. At the determined time, shown as position (d) in FIG. 2, the ECU directs the prechamber valve controller to open the prechamber valves which causes the pressure within the prechambers to rise rapidly. As discussed further below, the abrupt and rapid pressure increase within the prechambers can be relied upon to cause auto-ignition of the fuel-air mixture within the prechambers in approximately one millisecond (1 ms). The term "approximately 1 ms" as used herein may be taken to mean any value below 1 millisecond and any value up to 1.6 milliseconds. It is noted that the pressure equilibration time, or the time it takes for the pressure in the prechambers to rise to the pressure level in the cylinder is orders of magnitude faster than the 1 ms interval before auto-ignition.

At the same time that the conditions in the prechamber are set so as to cross the threshold for auto-ignition at point (d), the conditions in the cylinder are maintained close to, but below the threshold, so that while the pressures within the prechambers and the cylinder may be approximately the same, other conditions, such as the equivalence ratio ($\Phi$), temperature, and/or other parameters, such as the presence of catalysts, differ between them, and favor auto-ignition in the prechambers in comparison to the cylinder.

Figure 3:
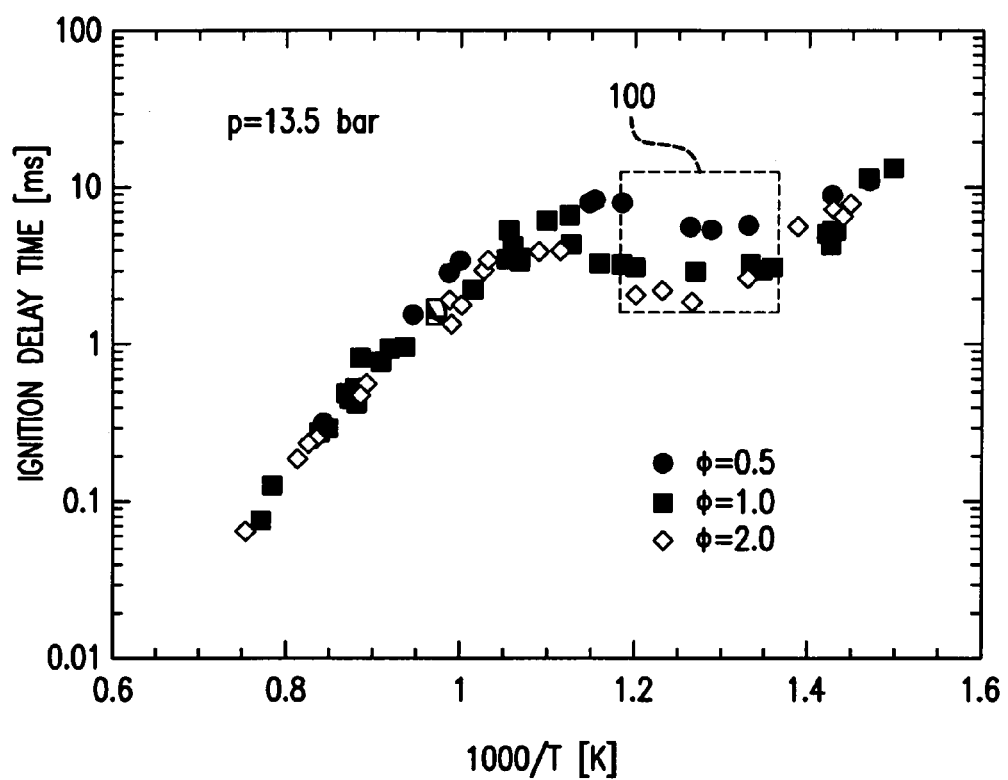
FIG. 3 shows plots of experimental data of ignition delay time versus inverse-temperature for n-Heptane taken at three different equivalence ratios.

The one millisecond interval between the opening of the microvalves and auto-ignition is referred to as the ignition delay time. It has been determined experimentally that under constant pressure, the ignition delay time is a function of both temperature and the contents of the fuel-air mixture expressed by the equivalence ratio $\Phi$, where lean mixtures have $\Phi<1$, and rich mixtures have $\Phi>1$. FIG. 3 shows plots of experimental data of ignition delay time (on the vertical axis) for n-Heptane maintained at a pressure of 13.5 bar plotted against inverse-temperature (1000/T) on the horizontal axis. Three different sets of data were taken using different equivalence ratios as indicated in the legend of the plot. A typical temperature within the engine at the end of a compression stroke prior to combustion is between about 650 to 1100 degrees Kelvin (K), or equivalently, an inverse temperature range of between about 0.9 and 1.5 $K^{-1}$. As can be discerned in FIG. 3, at inverse-temperature values between 1.2 and 1.4, the various plots diverge in the outlined graph area 100, and the effect of the mixture content becomes more pronounced. Within graph area 100, the ignition time delay at the diamond-shaped points, representative of an equivalence ratio of 2, is approximately 1 ms. In contrast, the ignition time delay at the circular points, representative of an equivalence ratio of 0.5, is approximately 10 ms, an order of magnitude difference. From this plot, it can be seen that control of the equivalence ratio within the prechambers, i.e., maintaining a rich mixture, leads to a much shorter ignition delay time in the typical temperature range prevailing in the engine.

Figure 4A:
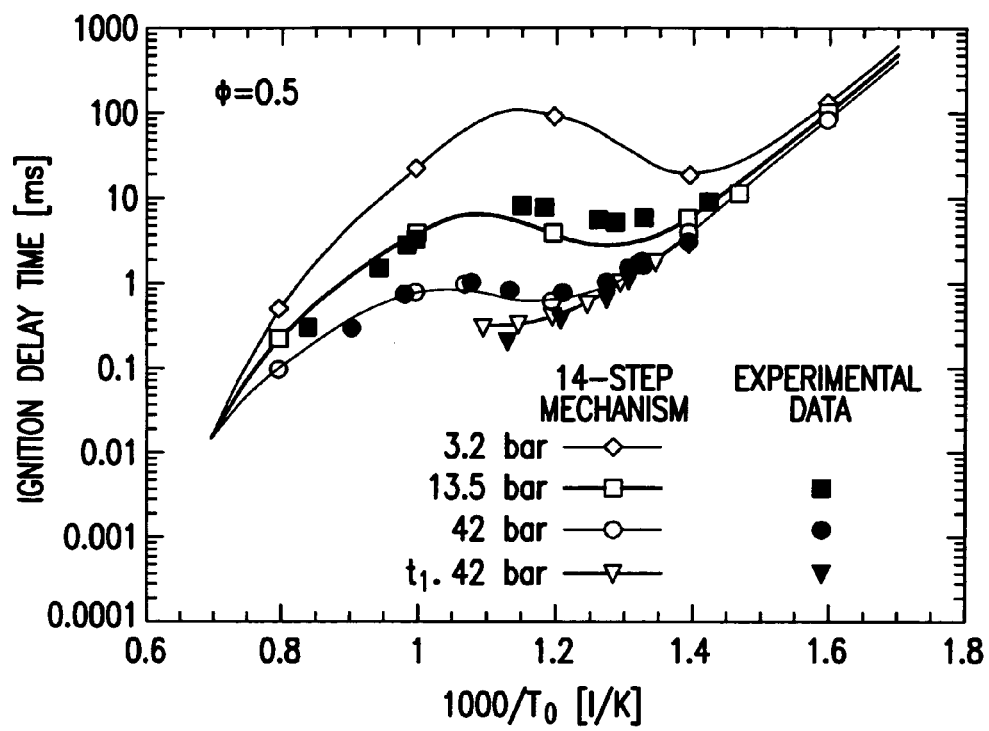
FIG. 4a shows plots of experimental data of ignition delay time versus inverse-temperature taken at three different pressure levels, for an equivalence ratio of 0.5.
Figure 4B:
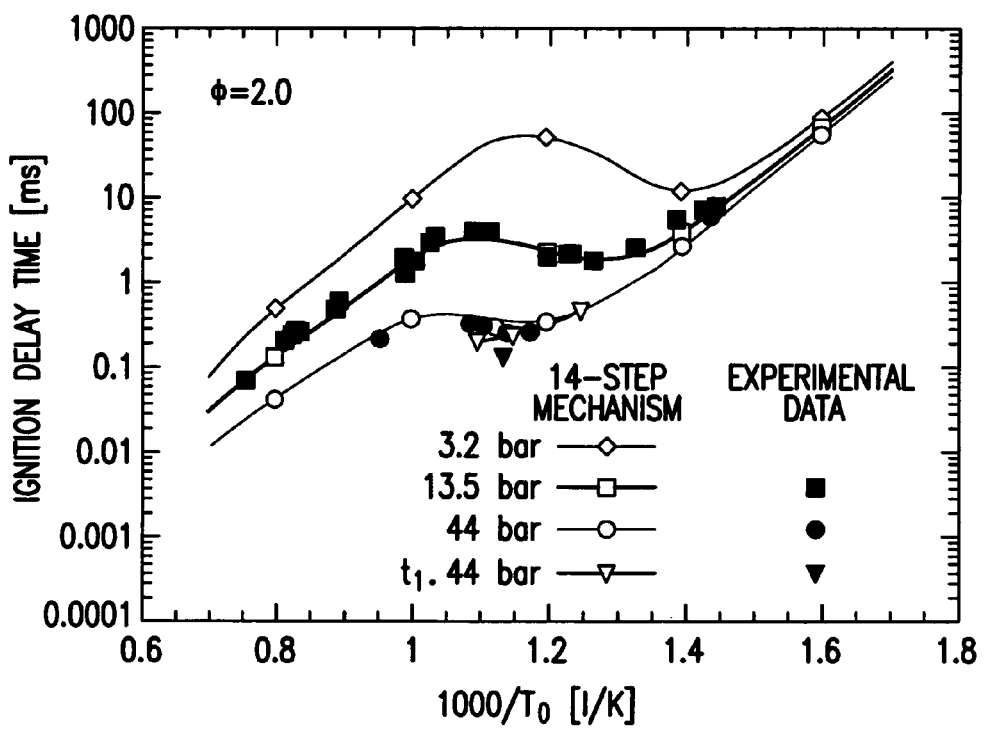
FIG. 4b shows plots of experimental data of ignition delay time versus inverse-temperature taken at three different pressure levels, for an equivalence ratio of 2.0.

However, the equivalence ratio is only one of several control variables that may be used to control, and more particularly, reduce, the prechamber auto-ignition timing according to the present invention. Other possible techniques include raising the temperature of the prechamber gases above 1000 K (at which point, as can be discerned in FIG. 3, the equivalence ratio becomes relatively immaterial), injecting additives that will lower the octane number and will also lower the auto-ignition time, and/or using a catalyst coating, such as hydrogen bromide (HBr), in the prechambers. The shorter ignition delay times for prechamber auto-ignition reduces the probability that the prechambers will not auto-ignite (misfire) and also ensures that the auto-ignition in the prechambers can be used to induce auto-ignition within the cylinder. In addition, as can be discerned in FIGS. 4a and 4b, an increase in pressure within the prechambers when the microvalves are open during the compression stroke also significantly reduces ignition delay time. FIGS. 4a and 4b each show plots of ignition delay time data versus inverse temperature taken at different pressures (13.5 bar, depicted with square data points, 44 bar depicted with circular points) at constant equivalence ratios, with the data shown in FIG. 4a being taken at an equivalence ratio of 0.5 and the data shown in FIG. 4b taken at an equivalence ratio of 2.0. As indicated, when the temperature in the cylinder is well within the typical range, and the inverse temperature is between 1 and 1.3, a boost in pressure from 13.5 to 44 bar decreases the ignition delay time by approximately an order of magnitude from between 2 and 10 ms to between 0.2 to 1 ms. Such a change in pressure level is in the range of the pressure increase in the prechambers during the compression stroke. For adequate control over the ignition process in the cylinder, the prechamber conditions are selected and the microvalves are operated so that the time it takes for the prechamber mixtures to auto-ignite corresponds to small changes in the cylinder piston position, and is much shorter than delay-time for auto-ignition with the cylinder.

Following ignition in the prechambers, jets of hot gases, which comprise a mixture of products of combustion and uncombusted reactants, are forced out of the prechambers through the open microvalves into the cylinder. The increase in temperature and pressure within the cylinder resulting from the incoming jets ensures that the threshold for auto-ignition within the cylinder is substantially surpassed, and that the contents of the cylinder auto-ignite. Thus, one of the main advantages of the present invention is that is makes use of the precise timing of auto-ignition in the prechambers to induce precisely-timed auto-ignition in the cylinder.

The HCJI system and method according to the present invention has the additional advantage over the PJC technique that HCJI jets are more energetic and bring about auto-ignition in the cylinder with greater certainty and rapidity by design; the PJC technique was never designed for achieving a complete auto-ignition but only for producing auto-ignition in the portion of reactants exposed to the PJC fireball. The controllability of auto-ignition in HCJI thus stems from the fact that HCJI utilizes volumetric combustion in the prechambers, which yields a higher and more rapid boost in pressure in the prechambers compared to the PJC technique.

In the foregoing description, the invention has been described with reference to a number of examples that are not to be considered limiting. It is to be understood and expected that variations in the principles of the systems and methods herein disclosed may be made by one skilled in the art and it is intended that such modifications, changes, and/or substitutions are to be included within the scope of the present invention as set forth in the appended claims.

What is claimed is:

1. A method of controlling auto-ignition timing in an internal combustion engine cylinder that is coupled to at least one prechamber, the method comprising:
   precisely controlling a timing of auto-ignition in the at least one prechamber, the auto-ignition in the at least one prechamber producing hot gas jets;
   inducing auto-ignition in the cylinder by introducing the hot gas jets from the at least one prechamber into the cylinder; and
   enriching a fuel-air mixture in the at least one prechamber to a rich level;
   wherein the auto-ignition in the at least one prechamber is induced by a pressure increase within the at least one prechamber with built-up pressure from the cylinder.

2. The method of claim 1, wherein each prechamber is coupled to the cylinder by at least one microvalve and each prechamber encloses a volume that is substantially smaller than a volume enclosed by the cylinder.

3. The method of claim 2, wherein the step of precisely controlling a time of auto-ignition in the at least one prechamber comprises:
   setting conditions in the at least one prechamber so as to cross a threshold for auto-ignition during precisely controlled time interval while conditions in the cylinder remain below the threshold for auto-ignition.

4. The method of claim 1, wherein the fuel-air mixture is enriched to an equivalence ratio of greater than 1.1.

5. The method of claim 3, further comprising:
   boosting a temperature within the at least one prechamber.

6. The method of claim 5, wherein the temperature within the at least one prechamber is boosted to over 1000 degrees Kelvin (K).

7. The method of claim 3, further comprising:
   injecting additives to the at least one prechamber suitable for facilitating auto-ignition in the at least one prechamber.

8. The method of claim 3, further comprising:
   coating walls of the at least one prechamber with a catalyst suitable for facilitating auto-ignition in the at least one prechamber.

9. The method of claim 3, further comprising:
   during a first stage of a compression stroke of a piston in the cylinder, opening the at least one microvalve of least one prechamber to bring the pressure within the at least one prechamber to a pressure level within the cylinder;
   during a selected time interval in an intermediate stage of the compression stroke, closing the at least one microvalve of the at least one prechamber; and
   at a subsequent stage of the compression stroke, opening the at least one prechamber microvalve, bringing the at least one prechamber to auto-ignition after a short time delay.

10. The method of claim 9, further comprising:
    adding fresh charge to the at least one prechamber to reach an elevated equivalence ratio with respect to the cylinder.

11. The method of claim 9, wherein the short time delay is approximately 1 millisecond (1 ms) in duration.

12. The method of claim 9, further comprising:
    determining, based on the requested load demand and current operating parameters in the cylinder, an optimum time to open the at least one microvalve to induce prechamber auto-ignition.

13. The method of claim 12, wherein the optimum time occurs when the piston is close to a top dead center (TDC) position.

14. A system for homogeneous combustion jet ignition in an internal combustion engine cylinder comprising:
    at least one prechamber coupled to the cylinder via at least one microvalve; and
    an electronic control unit, the electronic unit receiving data regarding requested load demand and current operating parameters within the cylinder, the electronic control unit configured to control the at least one microvalve based on the received data so as to induce an auto-ignition within the at least one prechamber, the auto-ignition being induced by an increase in pressure within the at least one prechamber with built-up pressure from the cylinder; and
    intake means for delivering fuel, air and additives to the at least one prechamber;
    wherein a fuel-air mixture within the at least one prechamber is enriched via the intake means.

15. The system of claim 14, wherein the at least one prechamber is situated near the top of the cylinder and encloses a volume that is substantially smaller than a volume enclosed by the cylinder.

16. The system of claim 15, wherein the electronic control unit precisely controls at least one microvalve of at least one of the at least one prechamber to:
    remain open at the beginning of a compression stroke in the cylinder;
    (b) close during an immediate stage of the compression stroke; and
    (c) open subsequently near a top-dead-center (TDC) position;
    wherein auto-ignition occurs within the at least one prechamber after a short ignition delay time after operation (c).

17. The system of claim 15, wherein additives are supplied to the at least one prechamber via the intake means.

18. The system of claim 15, further comprising:
    catalyst coating applied to internal walls of the at least one prechamber.

19. The system of claim 15, further comprising:
    means for boosting temperature within the at least one prechamber.

20. The system of claim 14, wherein the at least one microvalve includes an actuator coupled to a needle, the actuator causing the needle to shift, the shift of the needle opening or closing an orifice in the prechamber that leads to the cylinder.

21. The system of claim 14, wherein the actuator comprises a magnetic solenoid and coil.

22. The system of claim 14, wherein the actuator comprises a piezoelectric stack.

* * * * *